UNITED STATES PATENT OFFICE.

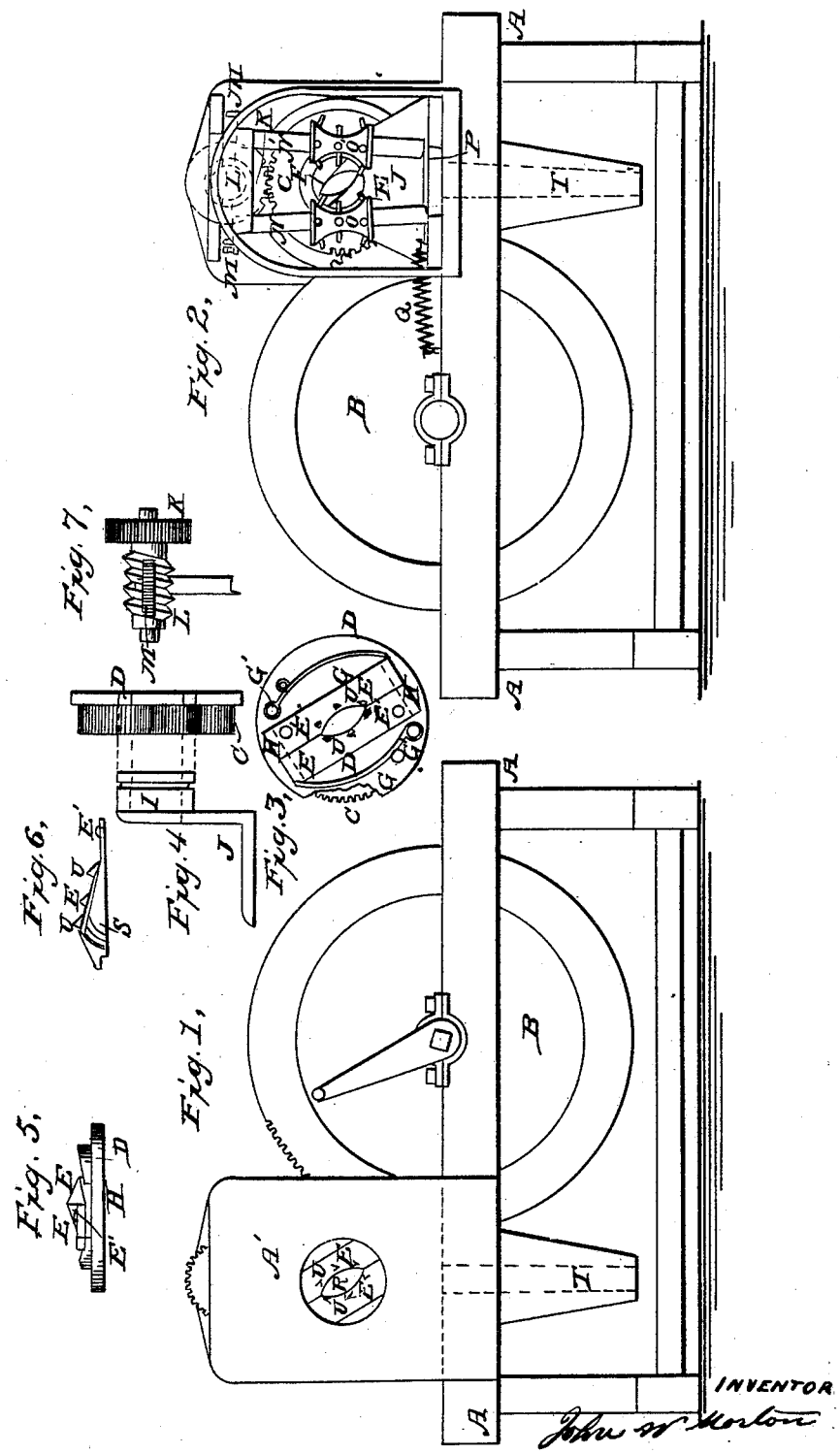

JOHN W. MORTON, OF BRUNSWICK, OHIO.

CORN-SHELLER.

Specification of Letters Patent No. 18,700, dated November 24, 1857.

*To all whom it may concern:*

Be it known that I, JOHN W. MORTON, of Brunswick, in the county of Medina and State of Ohio, have invented certain new and useful Improvements in Corn-Shellers; and I do hereby declare that the following is a full and exact description thereof, reference being had to the accompanying drawings, in which—

Figure 1 is a front side view, and Fig. 2, a view of the side opposite that shown in Fig. 1. The other views are detached sections which will be referred to in description.

Like letters denote like parts in the different views.

A, the frame of the machine. A' a casing to prevent the corn from scattering. B the driving wheel, the shaft of which revolves in boxes on the frame, and is turned by a crank, as seen in Fig. 1. The driving wheel meshes into the gear C, Fig. 2. This gear C, is attached to the face plate D, Figs. 3, 4, and 5, to which are attached the adjustable jaws E, E, Fig. 6, by a pin joint at E', E', Fig. 3, and to prevent any lateral movement of the ends upon which the springs G, rest, the ends turn at right angles, and pass under outside of the joint ends E' of the jaws, as represented by the dotted lines H, Fig. 3, and at H, Fig. 5, the springs G, are pinned to the face plate at G', G'. Through the gear C, and face plate D, is a circular hole, which receives the bearing I, on the stand J, Fig. 4. Through the bearing I, is also a circular hole, through which the cob passes.

The gear K, meshes into the gear C, as seen in Fig. 2. Upon the same shaft as the gear C, is attached an endless screw, as indicated at L. This screw works the gears M, M, one on each side; these gears are on the shafts N, N', to which shafts, are attached the spur rollers O, O', Figs. 2 and 7. The shafts N, and the screw shaft, may be in bearings or boxes, in the usual manner, but the lower end of the shaft N', revolves in an adjustable step, P, to this step, and the frame, is connected the spring Q, by which means, cobs of various sizes are drawn through by the adjustability of the roller O'. It will be observed, that, as the driving wheel revolves, the jaws are revolved, and by the connections of the gears C, and K, and the screw L, working the gears on the shafts N, N', the whole machine is simultaneously in operation.

The ears of corn, are passed into the opening R, Fig. 1, between the jaws; these jaws being adjustable, any sized ear of corn will be shelled in passing through. The inner edge, S, Fig. 6, of these jaws, are spreading, so as to form the section of a screw, by these, the cob, is drawn through to the spur rollers, which discharge the cob from the machine, while the corn passes down through the spout T, as it is separated from the cob, by the teeth U, on the jaws. By the action of the springs, G, the jaws are always in place, for shelling the various sized ears.

These devices, herein described, are not claimed to be new, individually considered.

This machine is more simple in its arrangement than others of the kind, and it performs its work with ease and rapidity, from the fact, that the ear does not have to be held by the hand as long, while passing through the jaws, to the spur rollers, which has to be done in all cases, in other machines on this principle. Where the distance from the jaws, to the spur rollers, is four or five inches, ears of less than four or five inches in length, cannot be shelled by it, through its own operation. Thus, nearly half of our corn, cannot be shelled by such machines which constitutes an objectionable feature in such machines.

In my working machines, the distance from the jaws, to the spur rollers, is one and a half inches, thus, it will be seen, that the short ears, are as readily shelled, as the long ones, which is an advantage that my machine has over others.

The necessity of holding by hand an ear, to shell four and a half inches of it, before it is let go of, or, of throwing aside, all that do not extend through the spur rollers, I have obviated in my machine.

The manner in which the jaws are made and adjusted, in my machine, renders it almost impossible to break them, with ordinary use, and the action of the springs G, G, always causes the jaws to close after each cob, as it passes through, there being no place for kernels to lodge between the jaws and keep them open, so that no corn will pass through unshelled. Another feature of my improvement consists in having the rollers O, O', revolve simultaneously by the action of the worm, so that the cob as soon as brought in contact with them will be discharged from the machine. By placing the rollers horizontally and only one continually revolving, and the other only by the passing between the two; that when the cobs are crooked, or not of the usual size, they will strike against the roller, and thereby they will remain in the jaws, and clog up the machine; but in my improvement, cobs of any size, straight or crooked, are discharged from the machine, revolving of both rollers prevents the stoppage of the cob.

I claim—

The driving of both the exit rollers O, O' in opposite directions by means of the endless screw L, or its equivalent, operating upon the gear M, the opposite end of one roller shaft N, being made adjustable by the step P, and the spring Q for the purpose of seizing the cob, whether large or small and delivering it from the machine as herein specified.

JOHN W. MORTON.

Witnesses:
A. BERDAN,
E. H. STRONG.